(12) United States Patent
Necsoiu et al.

(10) Patent No.: US 8,593,644 B2
(45) Date of Patent: Nov. 26, 2013

(54) WHITE LIGHT OPTICAL PROFILOMETER FOR MEASURING COMPLEX SURFACES

(75) Inventors: Dorel Marius Necsoiu, San Antonio, TX (US); Joseph N. Mitchell, San Antonio, TX (US); Jason O. Burkholder, Ruckersville, VA (US); William T. Gressick, Greenwood, VA (US)

(73) Assignee: Southwest Research Institute, San Antonio, TX (US)

( * ) Notice: Subject to any disclaimer, the term of this patent is extended or adjusted under 35 U.S.C. 154(b) by 434 days.

(21) Appl. No.: 12/966,877

(22) Filed: Dec. 13, 2010

(65) Prior Publication Data

US 2012/0147356 A1 Jun. 14, 2012

(51) Int. Cl.
 *G01B 11/24* (2006.01)
 *G01B 11/02* (2006.01)
 *G01C 3/00* (2006.01)
 *G01C 5/00* (2006.01)

(52) U.S. Cl.
 USPC ............................... 356/601; 356/3; 356/511

(58) Field of Classification Search
 USPC .......... 356/511, 600, 3, 601, 609; 250/559.22
 See application file for complete search history.

(56) References Cited

U.S. PATENT DOCUMENTS

| 4,667,231 | A | * | 5/1987 | Pryor | 348/128 |
|---|---|---|---|---|---|
| 5,239,366 | A | * | 8/1993 | Kittell et al. | 356/609 |
| 5,895,927 | A | * | 4/1999 | Brown | 250/559.19 |
| 6,765,606 | B1 | * | 7/2004 | Iddan et al. | 348/42 |
| 6,781,699 | B2 | * | 8/2004 | Dunn et al. | 356/511 |
| 2002/0180983 | A1 | * | 12/2002 | Ina et al. | 356/511 |
| 2002/0180987 | A1 | * | 12/2002 | Johnston et al. | 356/601 |
| 2006/0066855 | A1 | * | 3/2006 | Boef et al. | 356/401 |
| 2006/0244973 | A1 | * | 11/2006 | Yun et al. | 356/511 |
| 2008/0151264 | A1 | * | 6/2008 | Spencer | 356/601 |
| 2010/0253931 | A1 | * | 10/2010 | Meier et al. | 356/4.01 |

FOREIGN PATENT DOCUMENTS

JP 2000147122 A * 5/2000

* cited by examiner

*Primary Examiner* — Gregory J Toatley
*Assistant Examiner* — Dominic J Bologna
(74) *Attorney, Agent, or Firm* — Chowdhury & Georgakis, P.C.; Ann C. Livingston

(57) ABSTRACT

A white light optical profilometer having a measurement head that is separated from the base unit by means of a fiber optic bundle. The measurement head contains a Michelson objective, whose reference path is folded so that the measurement head may be compact. The measurement head also contains a tilting mirror, which directs light from the surface of interest to the objective, and may be adjusted to allow the measurement head to scan complex surfaces. The base unit contains the other elements of the profilometer, such as an image detector and illuminator.

17 Claims, 4 Drawing Sheets

WHITE LIGHT OPTICAL PROFILOMETER FOR MEASURING COMPLEX SURFACES

GOVERNMENT SUPPORT

This invention was made with U.S. Government support under Prime Contract No. N68335-09-C-0449, Subcontract No. 418-SC01, awarded by the Naval Air Warfare Center AD. The Government has certain rights in this invention.

TECHNICAL FIELD OF THE INVENTION

This invention relates to profilometers, and more particularly to an optical white light profilometer designed for measuring the profiles of complex surfaces.

BACKGROUND OF THE INVENTION

A "profilometer" is a measuring instrument used to measure a surface's profile, in order to quantify its roughness. Vertical resolution can be at the nanometer level; lateral resolution is usually poorer.

Profilometers are of either a contacting or non contacting type. A common implementation of a contacting profilometer uses a stylus, similar to that of a phonograph, which is moved in contact with a sample. This type of profilometer measures surface variations by measuring the vertical displacement of the stylus.

Non contacting profilometers are implemented optically. Optical white light profilometry is one of the best ways for performing high-resolution three-dimensional surface measurements at a reasonably rapid rate. Conventional white light optical profilometers are analogous to microscopes. An objective lens is attached to the same body as illumination and imaging components. Other optical techniques include laser triangulation (triangulation sensor), confocal microscopy (used for profiling very small objects) and digital holography.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, conventional optical white light profilometers have a design analogous to a microscope, with their objective lens and other optical components arranged along a rigid shared optical axis. Because of this design, they can only measure surfaces normal to that optical axis.

The following description is directed to a white-light optical profilometer, which can perform surface measurements of complex shaped objects as well as inside objects where conventional profilometers cannot reach. The profilometer of this description separates the measurement head from the remainder of the profilometer body so that the measurement head can be inserted into small spaces. The measurement head may also be articulated for rapid measurement of complex part geometries.

Figure 1:
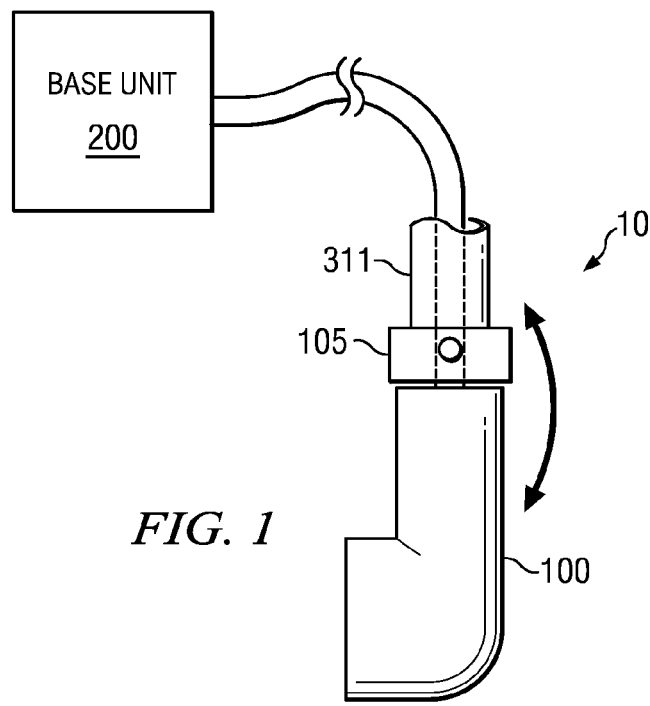
FIG. 1 illustrates the profilometer, which has a measurement head connected to a base unit by means of an optic cable.

FIG. 1 illustrates profilometer 10. The profilometer's measurement head 100 is separate from its base unit 200. As explained below, this separation facilitates the ability of the profilometer 10 to scan over a range of angles and to view inside hollow spaces.

A coherent fiber optic bundle 190 is an optical interface that connects the measurement head 100 to the base unit 200. The image acquired by the measurement head 100 is directed to the near endface of the fiber optic bundle 190.

At least a portion of the optic fiber bundle 190 nearest the measurement head 100 is housed in a tube 311. The connection between tube 311 and measurement head 100 is a "rotation joint" 105, which permits the measurement head 100 to be tilted (as indicated by the arrows).

Figure 2:
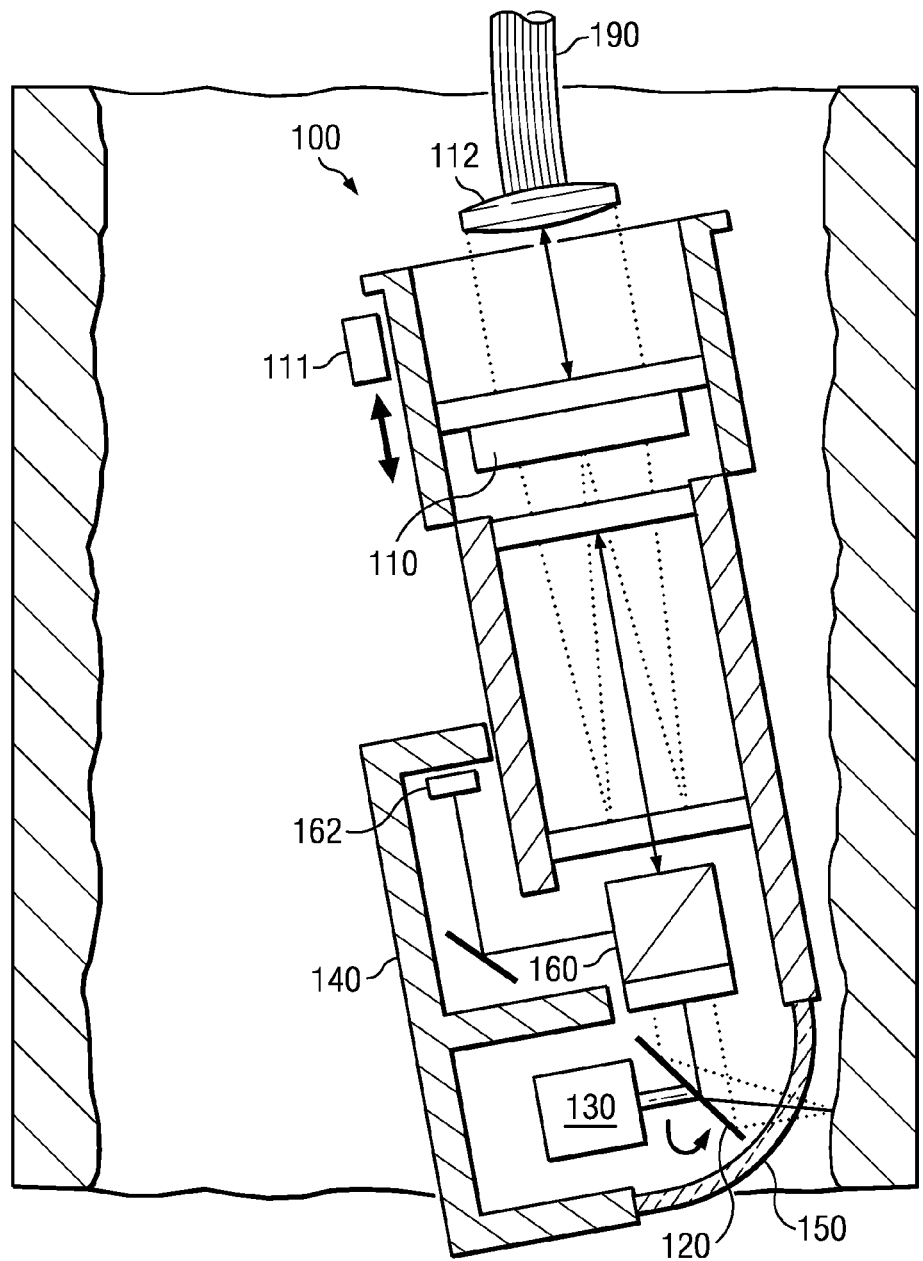
FIG. 2 illustrates the measurement head of FIG. 1 in further detail.

FIG. 2 illustrates the measurement head 100 in further detail. In the example of FIG. 2, the measurement head 100 is shown inside a cylindrical object (shown in cross section). As explained below, by being separated from the base unit 200, the measurement head may be readily positioned in x, y, and z-axes by external actuators, which may be automatic or manual or some combination of both. The measurement head itself is also capable of a rotational axis of travel.

The measurement head 100 has an interferometric objective 110. Because the design requires a long working-distance objective to provide standoff from the measurement surface, in the example embodiment, a Michelson interferometer design is used. Commercial Michelson objectives have the reference optical path perpendicular to the objective optical axis, however this creates a large package that is not suited to being placed inside small spaces. Thus, for objective 110, a beam splitter 160 and mirror 162 are used to fold the Michelson reference path around the side of the objective 110. This folded optical path helps to minimize the diameter of the measurement head 100. In other embodiments, the objective could be some design other than a Michelson objective.

As indicated by the arrow to the left of the objective 110, the objective 110 may be translated relative to the near endface of the fiber optic cable 190. This motion may be manual or automatically actuated (see FIG. 2), and provides for focusing for varying distances of the scan head 100 from the surface of interest. In the example of this description, objective 110 is actuated by a small piezoelectric translator 111, which responds to a control signal from the base unit 200.

The measurement head 100 is housed in a protective rigid housing 140. At the top of the housing, a lens 112 focuses light from the objective 110 to the endface of the optic fiber bundle. An example of a suitable lens 112 is a telecentric lens.

A transparent window 150 allows light to enter the scan head 140, and to reach tilting mirror 120. Tilting mirror 120 directs the light to a beam splitter 160, which divides the optical path into a first path to reference mirror 162 and a second path to objective 110.

Tilting mirror 120 is mounted below the image receiving end (base) of the objective 110 and is tilted by use of a high precision actuator 130. The actuator 130 may be, for example, an electric motor, and is remotely controlled.

Referring again to FIG. 1, using the rotation joint 105, the entire measurement head 100 is capable of tilting to accomplish scanning at a greater range of angles than the actuated mirror 120 alone could obtain. A typical range of motion for the tilting mirror 120 is about 30 degrees, providing 60 degrees of optical tilt. A typical range of motion for the tilt provided by the rotation joint 105 is about 15 degrees.

Figure 3:
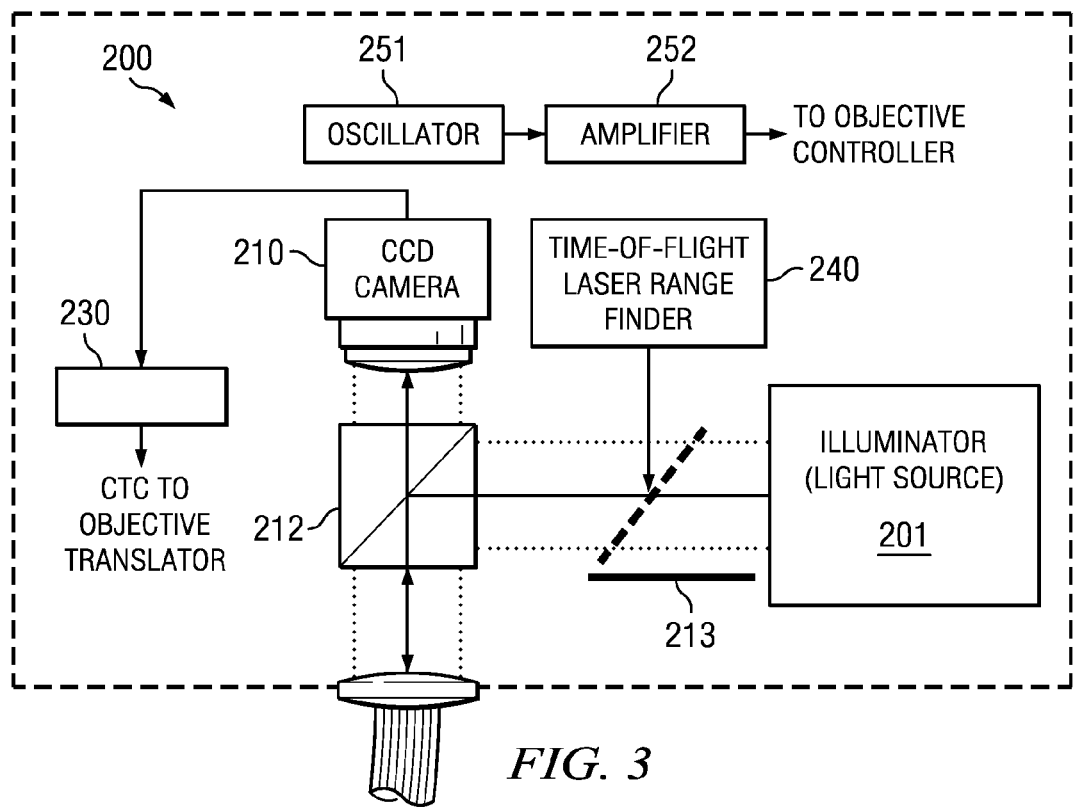
FIG. 3 illustrates the base unit of FIG. 1 in further detail.

FIG. 3 illustrates one embodiment of the profilometer base unit 200. The base unit 200 has at least an illuminator 201, an image detector 210, and processing unit 230.

The illuminator 201 is used to illuminate the fiber optic bundle 190, and includes at least a white light source. The illuminator 201 may also include lenses for directing and shaping the light and a bandpass filter for providing light of a specified wavelength.

An example of a suitable image detector 210 is a CCD camera. The image data acquired by detector 210 is delivered to processing unit 230.

Processing unit 230 has appropriate hardware and software for processing the image data from camera 210. For interferometric images, processing unit 230 includes programming for analyzing the fringe patterns of the images. Processing unit 230 also provides an interface for generating control signals, such as for adjusting the objective 110 or tilting mirror 130. Processing unit 230 may also be programmed to perform closed loop motion control of the measurement head 100, using acquired interferometry data, to maintain acceptable distance and orientation with respect to the surface of interest.

The fiber optic bundle 190 transmits an image projected from objective 110 onto one endface of the bundle to the other endface. The image can then be detected with the camera 210.

Rangefinder 240 is an optional time-of-flight laser device that may be used to perform an initial coarse scan of the surface of interest. This coarse measurement facilitates fast and accurate positioning of the measurement head 100 for actual measurement data acquisition.

Rangefinder 240 uses the same optical path (along fiber optic bundle 190 to the surface of interest) as the camera 210, but at different times. A light switch 213 is used to switch the light from the illuminator 201 between the two paths so that light reflected from the surface of interest is detected by either the camera 210 or rangefinder 240.

An oscillator 251 and amplifier 252 provide a control signal that controls the motion of the objective 110, as described above.

Figure 4:
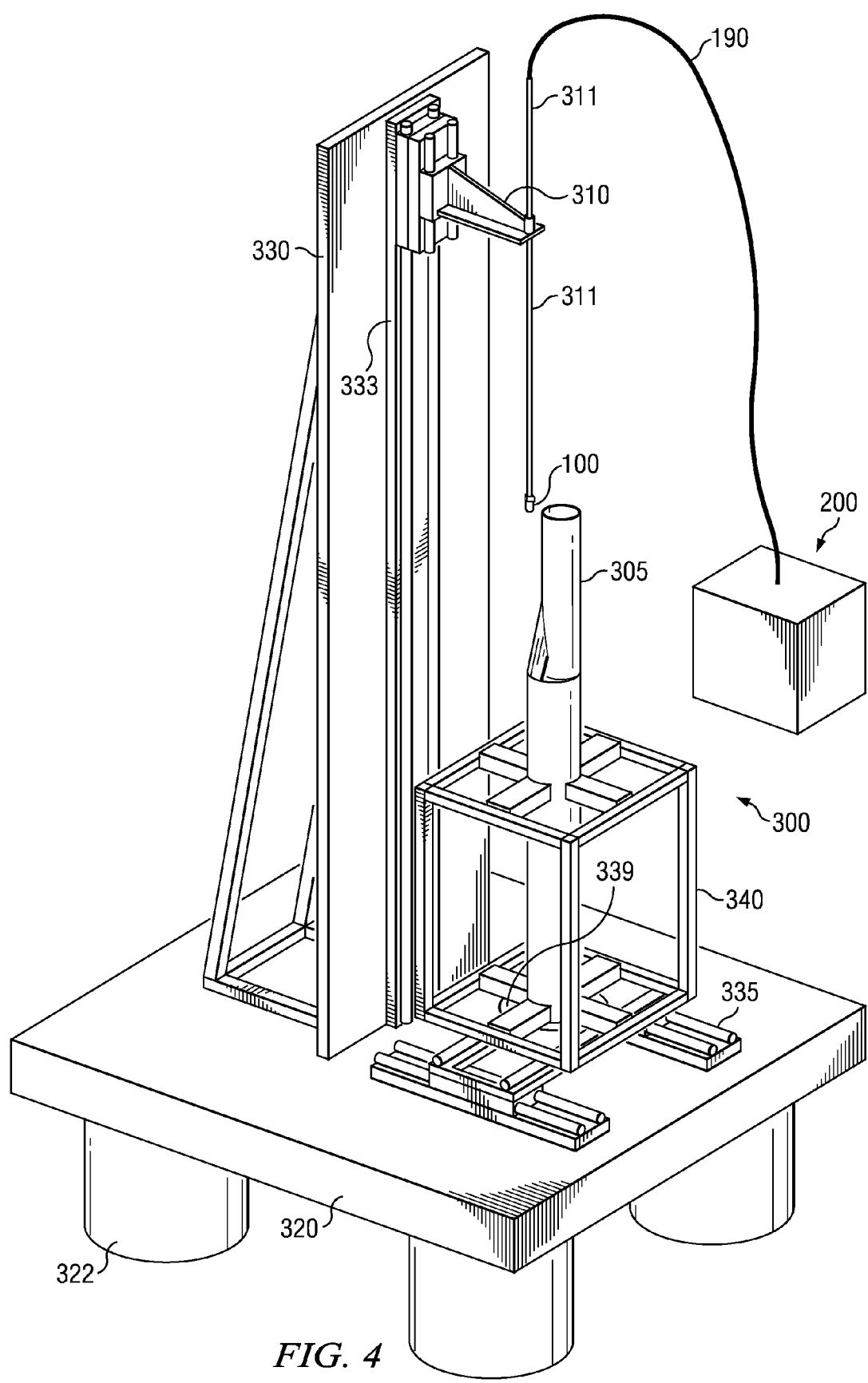
FIG. 4 illustrates an example of a test stand for supporting a test object while the measurement head is moved near one or more of its surfaces.

FIG. 4 illustrates a test stand 300, suitable for use with the profilometer 10. In the example of FIG. 4, the test article 305 is a hollow tube.

The measurement head 100 of the profilometer is attached to the test stand with a mounting fixture arm 310. The profilometer body 200 is remotely located, and connected to the scan head 100 by the optical fiber bundle 190.

The test stand 300 has a rigid base 320, mounted on vibration isolation mounts 322. A vertical support 330 supports a vertical translation track 333 along which a fixture arm 310 may be moved up and down. The scan head 100 is attached to the end of fixture arm 310.

The attachment of measurement head 100 to fixture arm 310 may be implemented with various means. In the example of FIG. 4, a thin hollow tube 311 extends through a hole at the end of fixture arm 310. The optical fiber bundle 190 is contained in this tube, and the measurement head 100 is attached to the end of the tube 311. During measurements, the tube 311 is dropped to a desired depth within the test object 305. As other examples (not shown), the measurement head 100 may hang from fixture 310 by means of optical fiber bundle 190 or may be directly attached to the end of the fixture arm.

The test article 305 is positioned, supported and secured in a support fixture 340. The fixture 340 is mounted on an arrangement of motion fixtures, namely a lateral motion track 335 and a rotational motion track 339. These tracks provide for "bulk" positioning in the x-y plane upon which the test object 305 rests. This bulk positioning, together with the vertical positioning provided by track 310 provides full three-dimensional bulk positioning of the test object 305 relative to the scan head 100.

Using test stand 300 or some other test arrangement, scanning tasks can broadly be categorized into internal and external types.

From the perspective of the test stand 300, an external scanning task is one in which the scan head 100 can be mounted more or less directly to the vertical (z-axis) fixture arm 310.

An internal scan requires the scan head 100 to be lowered into the test object 305. As stated above, the scan head 100 may be mounted at the end of a vertical support tube 311 that contains the optical fiber bundle 190. This support tube 311 is oriented vertically and should be mechanically stiff and as short as possible for the given scan task to reduce vibration.

Using test stand 300 or a similar device, the measurement head 100 may be positioned at any location in the workspace, and at any z-axis rotation to a given point on a test article.

Referring again to FIG. 1, once bulk positioning is performed, an additional (partial) angular degree of freedom is provided by the steering mirror 120 in the scan head 100. Optical limitations prohibit full rotation of the mirror 120, but additional angles can be achieved by the rotation joint 105, which is rotated in the same plane as the tilt mirror. Using the rotation joint 105 and tilt mirror 120 together, a full 90-degree field-of-view sweep can be accomplished. With these degrees of freedom, a minimal set of scan head fixturing can enable scanning of many different complex geometries.

Profilometer 10 is expected to be capable of imaging an area of about one square millimeter at a time with an in-plane resolution of about 2 microns and an out-of-plane resolution of about 0.1 microns. These values can be varied by using objectives with different magnifications. To collect data over larger areas, the head is repositioned between scans so that there is about 20% overlap between fields of view. The data are then merged in software. Because the parameters of the optical system are known, distortions and aberrations in each field can be corrected, yielding a large continuous measurement area.

Because of small field-of-view and close working proximity of the measurement head 100 to the surface of the test article, it is desirable to track the position of the measurement head in relation to the surface of interest. Knowledge of the surface also is important to plan an efficient scan of the measurement head's trajectory and to prevent surface collisions. As stated above, one approach to maintaining an acceptable distance and orientation of the measurement head is to use the interferometric measurement data to perform a closed loop motion control process.

Referring again to FIG. 3, the profilometer base unit 200 may alternatively incorporate a means to perform an initial coarse surface measurement. In this example, a laser rangefinder 240, which operates on a time-of-flight principle is located in the base unit 200. Optical pulses from the rangefinder 240 are directed to the scan head 100 via the coherent optical fiber bundle 190. Reflections from the surface of the test article are timed, and this information is used to determine the distance of the measurement head 100 from the test article surface during the initial scan. The rangefinder 240 may receive multiple return signals because its optical path includes the interferometer reference leg as well as the path to the test article. However, because this distance is known, it can be ignored in data processing.

In operation, the test article 305 is secured in the support frame 340. The profilometer 10 is used to perform an initial coarse surface scan for rapid and accurate scan head positioning and for motion path planning.

The user adjusts the support tube 311 and rotation joint 105 on the measurement head 100 to be nominally orthogonal to the test article in the area of interest, and positions the motion axes to a location near the area of interest. The offset distance also is set to be within the working distance of the rangefinder 240. An automated routine then moves the stages in a predetermined pattern while acquiring range data from the rangefinder 240. If the scan path causes the measured distance to exceed its working range, the offset distance is adjusted and orthogonality maintained (using the inverse kinematics of the system) to achieve accurate results. The coarse scan results in a three-dimensional point cloud from which a surface can be fit to the data using a least-squares algorithm. The user then selects a subset of the scanned region to proceed with the high-resolution interferometric scan.

Figure 5A:
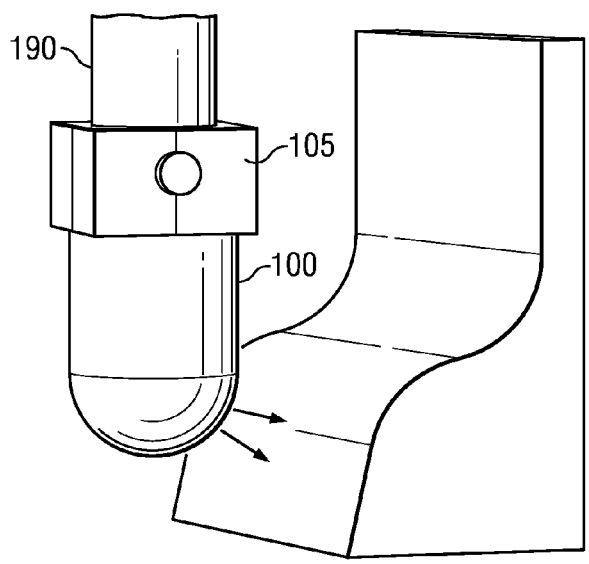
FIGS. 5A-5C illustrate how the scan head is used to measure a complex surface.
Figure 5B:
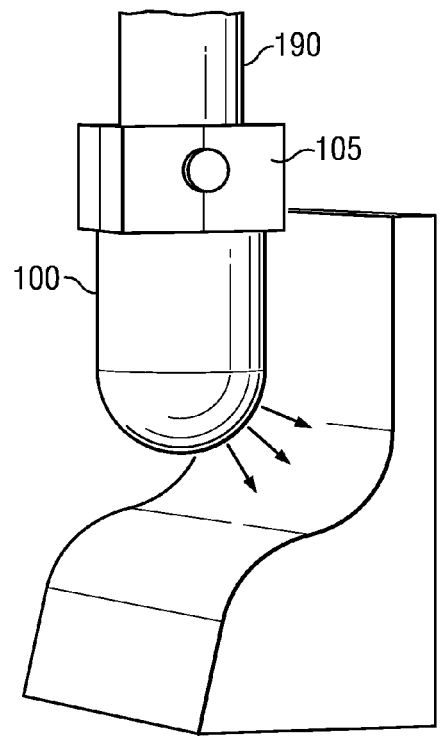
Figure 5C:
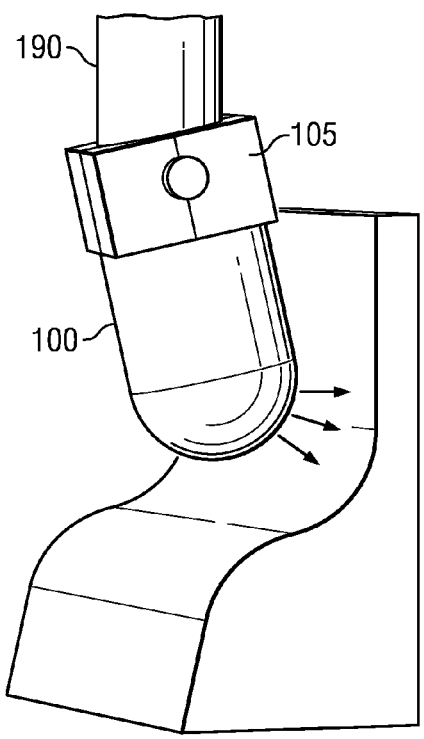

FIGS. 5A, 5B and 5C illustrate an example of using the scan head 100 to scan a complex surface. In FIG. 5B, relative to FIG. 5A, the internal tilting mirror 120 has been adjusted. In FIG. 5C, the scan head has been tilted using the rotation joint 105.

In other embodiments, profilometer 10 may or may not have a rotation joint 105 at the measurement head. Also, other embodiments may include more than one tilting mirror, or may include a mirror that tilts in more than one direction. In general, it is expected that the various embodiments will include some combination of one or more articulating joints at the scan head and one or more tilting (rotating) mirror, which provide for a scan of up to 90 degrees in plane.

What is claimed is:

1. A measurement head for a profilometer, for connection to a profilometer base unit via a fiber optic bundle that transmits light reflected from a surface of interest from the measurement head to the base unit, comprising:
    a housing having an upper end and a lower end, the lower end having a transparent window for allowing the light from the surface to enter the housing;
    wherein the housing is attached only to the fiber optic bundle;
    wherein the housing encloses the measurement head;
    a lens at the upper end of the housing for directing the light to an endface of the fiber optic bundle;
    an objective for producing an image of the surface for relay to the fiber optic bundle;
    a beam splitter for dividing the light between a first optical path and a second optical path, both optical paths being internal to the measurement head;
    wherein the first optical path comprises a tilting mirror;
    wherein the beam splitter passes light along a straight optical axis of the first optical path to the tilting mirror;
    wherein the tilting mirror is operable to direct light along the first optical path to the surface via the window and to direct light reflected from the surface back to the objective;
    wherein the second optical path comprises a fold mirror and a reference mirror;
    wherein the beam splitter directs light orthogonally along the second optical path to the fold mirror;
    wherein the fold mirror is operable to direct light orthogonally to the reference mirror and to reflect light from the reference mirror back to the beam splitter and the objective; and
    an actuator for tilting the tilting mirror to a desired angle.

2. The measurement head of claim 1, further comprising a rotatable connector for attaching the rest of the measurement head to the fiber optic bundle.

3. The measurement head of claim 2, wherein the combined range of motion of the rotatable connector and the tilting mirror allows a range of scan that is at least ninety degrees.

4. The measurement head of claim 2, wherein the rotatable connector and the tilting mirror are adjustable in the same plane.

5. The measurement head of claim 1, wherein the objective is an interferometric objective.

6. The measurement head of claim 1, further comprising an actuator for moving the objective.

7. A profilometer for acquiring light reflected from a surface of interest, comprising:
    a base unit;
    a measurement head;
    a fiber optic bundle that transmits the light reflected from the surface of interest from the measurement head to the base unit;
    wherein the measurement head comprises: a housing having an upper end and a lower end the lower end having a transparent window for allowing the light from the surface to enter the housing; wherein the housing is attached only to the fiber optic bundle; wherein the housing encloses the measurement head; a lens at the upper end of the housing for directing the light to an endface of the fiber optic bundle; an objective for producing an image of the surface for relay to the fiber optic bundle; a beam splitter for dividing the light between a first optical path and a second optical path, both optical paths being internal to the measurement head; wherein the first optical path comprises a tilting mirror; wherein the beam splitter passes light along a straight optical axis of the first optical path to the tilting mirror; wherein the tilting mirror is operable to direct light along the first optical path to the surface via the window and to direct light reflected from the surface back to the objective; wherein the second optical path comprises a fold mirror and a reference mirror; wherein the beam splitter directs light orthogonally along the second optical path to the fold mirror; wherein the fold mirror is operable to direct light orthogonally to the reference mirror and to reflect light from the reference mirror back to the beam splitter and the objective; and an actuator for tilting the tilting mirror to a desired angle; and
    wherein the base unit comprises: an image detector for receiving light from the fiber optic bundle and for providing image data from the light; an illuminator for providing light to be transmitted by the fiber optic bundle from the base unit and reflected from the surface of interest.

8. The profilometer of claim 7, wherein the objective is configured as an interferometric objective.

9. The profilometer of claim 8, wherein the base unit further comprises an optical rangefinder that shares the fiber optic bundle and is configured to provide a coarse surface measurement of the surface of interest.

10. The profilometer of claim 8, wherein the image detector is a CCD camera.

11. The profilometer of claim 8, wherein the base unit further comprises a processing unit for controlling the motion of the measurement head.

12. A method of using a profilometer to perform profile measurements of a surface of interest, comprising:
    separating a measurement head from a base unit by means of a fiber optic bundle;
    placing the measurement head at a desired location near the surface;

wherein the measurement head comprises: a housing having an upper end and a lower end the lower end having a transparent window for allowing the light from the surface to enter the housing; wherein the housing is attached only to the fiber optic bundle; wherein the housing encloses the measurement head; a lens at the upper end of the housing for directing the light to an endface of the fiber optic bundle; an objective for producing an image of the surface for relay to the fiber optic bundle; a beam splitter for dividing the light between a first optical path and a second optical path, both optical paths being internal to the measurement head; wherein the first optical path comprises a tilting mirror; wherein the beam splitter passes light along a straight optical axis of the first optical path to the tilting mirror; wherein the tilting mirror is operable to direct light along the first optical path to the surface via the window and to direct light reflected from the surface back to the objective; wherein the second optical path comprises a fold mirror and a reference mirror; wherein the beam splitter directs light orthogonally along the second optical path to the fold mirror; wherein the fold mirror is operable to direct light orthogonally to the reference mirror and to reflect light from the reference mirror back to the beam splitter and the objective; and an actuator for tilting the tilting mirror to a desired angle;

positioning the tilting mirror in the measurement head to a desired position to receive light from the surface of interest and to direct the light to an objective;

using the objective in the measurement head to focus light from the tilting mirror to the endface of the fiber optic cable;

transmitting the light to the base unit via the fiber optic cable; and using an image detector in the base unit to detect the light as interferometric images of the surface.

13. The method of claim 12, further comprising attaching the fiber optic bundle to the measurement head with a rotatable connector.

14. The method of claim 12, further comprising the step of using an optical rangefinder in the base unit to perform a coarse scan of an area of the surface of interest.

15. The method of claim 14, wherein the rangefinder has an optical path that uses the fiber optic bundle, and further comprising using a light switch to switch between an optical path to the rangefinder and an optical path to the image detector.

16. The method of claim 14, wherein the rangefinder is a time-of-flight laser rangefinder.

17. The method of claim 14, wherein data acquired by the rangefinder is used to control the motion of the measurement head.

* * * * *